United States Patent [19]

Iwano et al.

[11] Patent Number: 5,281,119
[45] Date of Patent: Jan. 25, 1994

[54] APPARATUS FOR THE PRODUCTION OF FOAMED POLYOLEFIN SHEETS

[75] Inventors: Shoji Iwano, Kamitsuga; Kouichi Wakabayashi, Kanuma; Yoshihisa Ishihara, Utsunomiya, all of Japan

[73] Assignee: Japan Styrene Paper Corporation, Tokyo, Japan

[21] Appl. No.: 958,457

[22] Filed: Oct. 7, 1992

Related U.S. Application Data

[60] Continuation-in-part of Ser. No. 564,561, Aug. 9, 1990, abandoned, which is a division of Ser. No. 433,157, Nov. 8, 1989, abandoned.

[30] Foreign Application Priority Data

Nov. 11, 1988 [JP] Japan ................. 63-285289

[51] Int. Cl.⁵ ............................................ B29D 23/00
[52] U.S. Cl. .................................... 425/72.1; 264/51; 264/55; 264/210.7; 264/565; 425/296; 425/326.1
[58] Field of Search ............ 264/51, 55, 210.7, 209.4, 264/565, 566, 568; 425/72.1, 326.1, 296

[56] References Cited

U.S. PATENT DOCUMENTS

| | | | |
|---|---|---|---|
| 2,433,937 | 1/1948 | Tornberg | 264/559 |
| 2,708,772 | 5/1955 | Moncrieff | 264/209.4 |
| 2,814,071 | 11/1957 | Allan et al. | 264/209.4 |
| 2,987,765 | 6/1961 | Cichelli | 264/565 |
| 3,311,681 | 3/1967 | Cherney et al. | 264/53 |
| 3,426,111 | 2/1969 | Simpson | 264/51 |
| 3,539,666 | 11/1970 | Schirmer | 264/51 |
| 3,619,445 | 11/1971 | Carlson | 264/210.7 |
| 3,835,209 | 9/1974 | Karabedian | 425/384 |
| 3,976,733 | 8/1976 | Havens | 425/326.1 |
| 4,115,048 | 9/1978 | Alderfer et al. | 425/72.1 |
| 4,165,356 | 8/1979 | Heider | 264/565 |
| 4,426,065 | 1/1984 | Komatsuzaki et al. | 264/53 |
| 4,698,196 | 10/1987 | Fabian | 425/296 |
| 4,704,238 | 11/1987 | Okuyama et al. | 264/565 |
| 4,828,770 | 5/1989 | Fabian et al. | 264/568 |

*Primary Examiner*—David A. Simmons
*Assistant Examiner*—William J. Matney, Jr.
*Attorney, Agent, or Firm*—Sherman and Shalloway

[57] ABSTRACT

An apparatus for the formation of a foamed polyolefin sheet provided with a cylindrical cooling device for cooling a foamed extruded tubular body at one end of an extruder, air outlets for increasing the internal pressure of the cooled foamed tubular body at a region between the extruder die and the upstream section of a cylindrical cooling device and between at least two adjacent sections of a cylindrical cooling device and a cutting blade for slitting the foamed tubular body enables the production of foamed polyolefin sheets with improved surface characteristics and strength.

4 Claims, 1 Drawing Sheet

5,281,119

APPARATUS FOR THE PRODUCTION OF FOAMED POLYOLEFIN SHEETS

This application is a continuation-in-part of application Ser. No. 07/564,561, filed Aug. 9,1990; which is a division of application Ser. No. 07/433,157, filed Nov. 8, 1989, both are now abandoned.

BACKGROUND OF THE INVENTION

1) Field of the Invention

This invention relates to a process for the production of a foamed polyolefin sheet and also to an apparatus therefor.

2) Description of the Related Art

Conventionally, foamed polyolefin sheets have each been produced by extruding a polyolefin resin, which contains a blowing agent, into a low-pressure zone through an annular die provided at an end of an extruder to form a foamed tubular body, bringing the foamed tubular body into contact with a peripheral surface of a cylindrical cooling device to cool the foamed tubular body and then slitting the thus-cooled foamed tubular body in the direction of extrusion to open same. In this conventional process, it is however difficult to increase the ratio (blow ratio) of the diameter of the annular die to the diameter of the cylindrical cooling device because the extensibility of the extruded foamed tubular body drops abruptly. When the blow ratio is small, the foamed tubular body cannot be extended sufficiently. As a result, corrugations occur in the resulting foamed sheet, resulting in problems such that these corrugations deteriorate the external appearance of the product, lower the accuracy upon cutting the sheet and also reduce the accuracy of bonding namely, form portions having good strength and those having poor strength when employed for lamination. It is preferred that a blowing agent employed for the production of such foamed sheets is inexpensive. Economical butane is suitable from this standpoint. The use of a blowing agent having a high foaming speed, like butane, is accompanied by the problem that the occurrence of corrugations becomes particularly remarkable. It has therefore been desired to develop a process which can provide foamed polyolefin sheets, which contain fewer corrugations, by using an inexpensive blowing agent such as butane.

SUMMARY OF THE INVENTION

The present invention has been completed to solve the above-described drawbacks of the conventional art. It is therefore an object of the present invention to provide a process for the production of a foamed polyolefin sheet containing fewer corrugations compared to the conventional processes and also to provide an apparatus therefor.

In one aspect of this invention, there is thus provided a process for producing a foamed polyolefin sheet by extruding a molten polyolefin resin, which contains a blowing agent, into a low-pressure zone through an annular die provided at an end of an extruder to form a foamed tubular body, bringing the foamed tubular body into contact with a peripheral surface of a cylindrical cooling device to cool the foamed tubular body and then slitting the thus-cooled foamed tubular body in the direction of extrusion to open same, which process comprises:

dividing the cylindrical cooling device into at least two sections; and increasing the internal pressure of the foamed tubular body between the die and the upstream section of the cylindrical cooling device and also between at least two adjacent sections of the cylindrical cooling device to apply tension to the foamed tubular body at the inner wall.

In a preferred embodiment, 1-40 parts by weight of butane may be used as the blowing agent per 100 parts by weight of low-density polyethylene to provide a foamed polyethylene sheet having an expansion ratio of 2-100 times, preferably, the expansion ratio is more than 15.

In another preferred embodiment, the die and the device may satisfy the following equations:

$$DD/MD = \text{about } 0.1 \text{ to about } 0.5$$

$$MD/ML = 0.5-0.02$$

wherein DD is a ring diameter of the annular die, MD the maximum diameter of the cylindrical cooling device and ML the length from the upstream end of the most upstream section of the cylindrical cooling device to the downstream end of the most downstream section of the cylindrical cooling device, all expressed in terms of mm.

In a further preferred embodiment, the MD and ML of the cylindrical cooling device may be 150–1,000 mm and 300–1,000 mm, respectively.

In another aspect of this invention, there is also provided an apparatus for the production of a foamed polyolefin sheet, which comprises:

a cylindrical cooling device provided in at least two sections for cooling a foamed tubular body extruded through an annular die which is provided at an end of an extruder;

air outlets arranged between the annular die and the most upstream section of cylindrical cooling device and between at least two adjacent sections of the cylindrical cooling device, respectively, thereby cooling and increasing the internal pressure of the thus-cooled foamed tubular body and applying tension to the foamed tubular body at the inner wall; and a means for slitting the resultant foamed tubular body in the direction of extrusion to open same.

In a preferred embodiment, at least one of said at least two of the cylindrical cooling device may be movable.

In another preferred embodiment, the die and the device may satisfy the following equations:

$$DD/MD = \text{about } 0.1 \text{ to about } 0.5 \text{ and}$$

$$MD/ML = 0.5-0.02$$

wherein DD is a ring diameter of the annular die, MD the maximum diameter of the cylindrical cooling device and ML the length from the upstream end of the most upstream section of the cylindrical cooling device to the downstream end of the most downstream section of the cylindrical cooling device, all expressed in terms of mm.

In a further preferred embodiment, the MD and ML of the cylindrical cooling device may be 150–1,000 mm and 300–15,000 mm, respectively.

According to the process of the present invention, the internal pressure of the foamed tubular body extruded from the annular die of the extruder is increased between the annular die and the most upstream section of cylindrical cooling device and also between at least two adjacent sections of the cylindrical cooling device which are divided into at least two sections. This has made it possible to obtain a foamed polyolefin sheet which contains fewer corrugations compared to those obtained by the conventional process. Further, corrugations can be effectively reduced further by limiting DD/MD and MD/ML to about 0.1 to about 1.0 and 0.5-0.02, respectively and/or MD and ML to 150-1,000 mm and 300-15,000 mm, respectively. Corrugations tend to occur especially when a composition comprising 100 parts by weight of low-density polyethylene and 1-40 parts by weight of butane is extruded at an expansion ratio of 2-100 times. However, the process of this invention can effectively prevent occurrence of corrugations in such instances. On the other hand, the apparatus according to this invention includes air outlets arranged between the annular die and the most upstream section of cylindrical cooling device and also between at least two adjacent sections of the cylindrical cooling device, respectively, thereby cooling and increasing the internal pressure of the thus-cooled foamed tubular body and hence applying tension to the foamed tubular body at the inner wall. The apparatus therefore permits practice of the process of this invention without failure. When at least one of the sections of the cylindrical cooling device is rendered movable, a desired MD/ML ratio can be chosen. As a result, this has the advantage that said at least one section of the cylindrical cooling device can be placed at a position optimal for the reduction of corrugations depending on the kinds and proportions of the resin and blowing agent employed.

BRIEF DESCRIPTION OF THE DRAWING

The above and other objects, features and advantages of the present invention will become apparent from the following description of the invention and the appended claims, taken in conjunction with the accompanying sole drawing, which illustrates one embodiment of this invention, namely, which is a partly cutaway schematic side view showing the production of a foamed sheet by a production apparatus according to this invention.

DETAILED DESCRIPTION OF THE INVENTION AND PREFERRED EMBODIMENT

Figure 1:
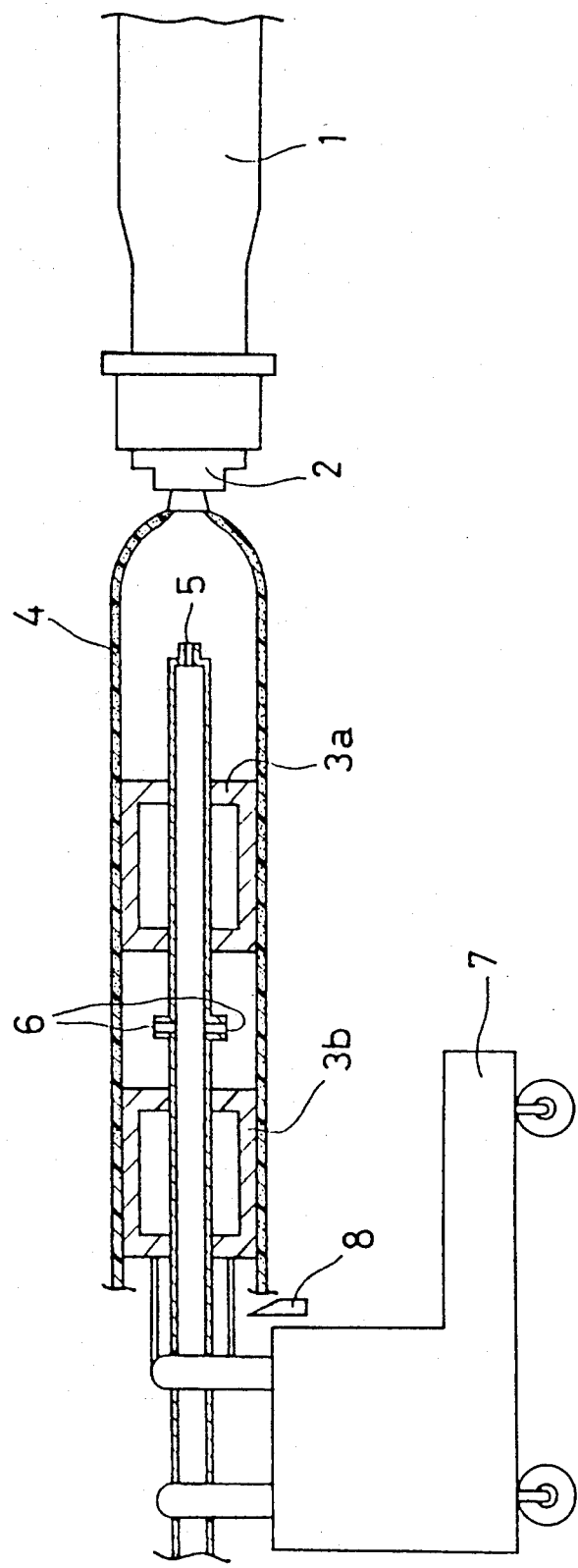

The term "polyolefin resin" as used herein may include high-density polyethylene, low-density polyethylene, linear low-density polyethylene, polypropylene, polybutene-1, ethylene-propylene copolymers, ethylene-vinyl acetate copolymers containing at least 60 wt. % of the ethylene component, ethylene-styrene graft copolymers, ethylene-vinyl chloride copolymers, etc.

Examples of the blowing agent used in the process of the present invention may include aliphatic hydrocarbons and alicyclic hydrocarbons such as propane, butane, pentane, hexane, cyclobutane and cyclopentane; volatile blowing agents such as halogenated hydrocarbons, e.g., monochlorodifluoromethane, trichlorofluoromethane, dichlorodifluoromethane, dichlorotetrafluoromethane, methyl chloride, ethyl chloride and methylene chloride; decomposable blowing agents such as azodicarbonamide, N,N'-dinitrosopentamethylenetetramine, azobisisobutyronitrile, p,p'-oxybis(-benzene sulfonyl hydrazide) and sodium bicarbonate.

The preferred range of the mixing ratio of the polyolefin resin to the blowing agent varies depending on the kinds of the polyolefin resin and blowing agent employed. When low-density polyethylene and butane are used as polyolefin resin and blowing agent respectively by way of example, butane is generally used in an amount of 1-40 parts by weight, preferably 10-30 parts by weight per 100 parts by weight of low-density polyethylene.

According to the process of this invention, a foamable polyolefin resin which has been formed by melting and kneading the polyolefin resin and blowing agent in an extruder is extruded into a low-pressure zone through an annular die provided at an end of the extruder, whereby the foamable polyolefin resin is formed into a foamed tubular body. The foamed tubular body is then brought into contact with a peripheral surface of a cylindrical cooling device divided into at least two sections. The process of the present invention also features that the internal pressure of the foamed tubular body is increased to apply tension to the inner wall of the foamed tubular body between the annular die and the upstream section of cylindrical cooling device and also between at least two sections of the cylindrical cooling device. As a method for cooling the foamed tubular body and also for increasing the internal pressure of the foamed tubular body, it may be mentioned to feed air into the interior of the foamed tubular body. Preferably, the pressure of the air blown against the inner wall of the tubular body in the area between the annular die and the most upstream section of the cooling device, and between the sections of the cooling device, is in the range of about $5 \times 10^{-4}$ to about $3 \times 10^{-2}$ kg/cm² (G).

In the present invention, it is preferred to limit the ratio of the ring diameter (DD) of the annular die to the maximum diameter (MD) of the cylindrical cooling device, DD/MD (i.e., blow ratio), to about 0.1 to about 0.5 and the ratio of the maximum diameter of the cylindrical cooling device (MD to the length (ML) from the upstream end of the most upstream section of the cylindrical cooling device to the downstream end of the most downstream section of the cylindrical cooling device, MD/ML, to 0.5-0.02. It is also preferred to limit the maximum diameter (MD) of the cylindrical cooling device to 150-1,000 mm and the length (ML) from the upstream end of the most upstream section of the cylindrical cooling device to the downstream end of the most downstream section of the cylindrical cooling device to 300-15,000 mm. When DD, MD and ML are chosen as described above, it is possible to effectively reduce corrugations in foamed sheets to be obtained.

In a preferred embodiment, it is preferred that the cooling device satisfy the following relationships:

$$5 > ML'/MD > 1.5$$

$$3 > MML/ML' > 0.4$$

wherein ML' is the length of a section of the cooling device, MD is the maximum diameter of the cooling device and MML is the distance from the downstream end of a section of the cooling device to the upstream end of the immediately adjacent downstream section of the cooling device.

Incidentally, the outer diameter of the cylindrical cooling device is not constant along the entire length thereof. It varies depending upon the location measured because of the existence of projections and/or raised portions. Therefore, the term "maximum diameter: MD of the cylindrical cooling device" as used herein means the diameter at the largest portion of the cylindrical cooling device.

The foamed tubular body which has been cooled by the cylindrical cooling device is then slit in the direction of extrusion, whereby a sheet having an expansion ratio of generally 2-100 times, preferably 20-60 times is formed.

When a sheet having an expansion ratio in the above range is obtained in this invention, a marked decrease of corrugations can be observed.

An apparatus according to this invention, which is suitable for use in the practice of the process of this invention, is illustrated in FIG. 1. Numeral 1 indicates an extruder equipped an annular die 2 at one end thereof and symbols 3a,3b designate a cylindrical cooling device divided into two sections. Although not shown in the figure, a cooling jacket is arranged on the inner peripheral wall of the cylindrical cooling device. (Typically, the cooling device is cooled with a cooling medium having a temperature of 20° C. or lower.); A foamable polyolefin composition charged n the extruder 1 is extruded into a foamed tubular body 4 through the annular die 2 provided said one end of the extruder 1. The foamed tubular body 4 is then successively cooled by the sections 3a,3b of the cylindrical cooling device. Air is fed through an air outlet 5 of an air feed pipe, said air outlets 5 being arranged between the annular die 2 and the upstream section 3a of the cylindrical cooling device, thereby cooling the foamed tubular body and also increasing the internal pressure of the foamed tubular body 4. The air feed pipe has another air outlet 6 which is located between the upstream section 3a and downstream section 3b of the cylindrical cooling device. By the air fed through the air outlet 6, the internal pressure of the foamed tubular body 4 is also increased between the upstream section 3a and downstream section 3b of the cylindrical cooling device and at the same time, the foamed tubular body 4 is also cooled by the air thus fed. The air pressure of air blown against the inner wall of the tubular body from the air outlets arranged between the annular die and the most upstream section of the cooling device, and between the sections of the cooling device, is preferably in the range of about $5 \times 10^{-4}$ to about $3 \times 10^{-2}$ kg/cm$^2$ (G). If the pressure is lower than $5 \times 10^{-4}$ kg/cm$^2$, corrugations form on the tubular body. On the other hand, if the pressure is greater than $3 \times 10^{-2}$ kg/cm$^2$, it becomes difficult to stably pass the tubular body through the cooling device and removal of the tubular body from the apparatus is hindered. As described above, the values of DD/MD and MD/ML should preferably be about 0.1 to about 0.5-0.02, respectively. To permit adjustment of the length, ML, for example the downstream section 3b of the cylindrical cooling device is designed to be slidably movable on the air feed pipe by means of a drive means 7 in the apparatus of this invention. As an alternative, the downstream section 3b may be fixed and instead, the upstream section 3a may be arranged movably. Owing to the adoption of this design, the ratio, MD/ML, can be chosen as desired. Incidentally, numeral 8 indicates a cutting blade for slitting the foamed tubular body 4 in the direction of extrusion and hence opening same into a flat sheet.

It is to be noted that a mandrel such as that disclosed in U.S. Pat. No. 3,311,681 to J. A. Cherney can also be used in place of the cylindrical cooling device described above. The term "cylindrical cooling device" as used herein should therefore be interpreted in such a broad sense as embracing the mandrel of the above U.S. patent.

The present invention will hereinafter be described more specifically by the following examples.

EXAMPLE 1

Added as a blowing agent to low-density polyethylene in an extruder was 21.5 wt. % of butane. The resultant composition was molten and kneaded and then extruded at a discharge rate of 118 kg/hr through an annular die whose DD was 95 mm (DD=95 mm), whereby a foamed tubular body was formed. Air was fed at a flow velocity of 50 m$^3$/min into the foamed tubular body between the annular die and the upstream section of the cylindrical cooling device, so that the internal pressure of the foamed tubular body was increased and the tubular body was cooled. Thereafter, the foamed tubular body was cooled by means of a cylindrical cooling device divided into two sections. The MD and ML of the cylindrical cooling device were 350 mm and 3,000 mm, respectively (MD=350 mm; ML=3,000 mm). Therefore, the DD/MD and MD/ML were 0.27 and 0.12, respectively (DD/MD=0.27; MD/ML=0.12). Air was fed at a flow velocity of 50 m$^3$/min. into the foamed tubular body between the respective sections of the cylindrical cooling device, so that the foamed tubular body was cooled while increasing its internal pressure. The thus-cooled foamed tubular body was then slit open into a flat sheet. Physical properties of the resultant sheet are shown in Table 1.

COMPARATIVE EXAMPLE 1

Following the procedure of Example 1, the same blowing agent was added in the same amount to the same low-density polyethylene, followed by melting and kneading. The resultant composition was extruded at a discharge rate of 148 kg/hr through an annular die whose DD was 110 mm (DD=110 mm), thereby forming a foamed tubular body. Without increasing the internal pressure of the foamed tubular body, it was guided to a nondivided cylindrical cooling device whose MD and ML were 390 mm and 1,000 mm, respectively (MD=390 mm; ML=1,000 mm). Thereafter, the thus-cooled foamed tubular body was slit open into a generally flat sheet. Physical properties of the resultant sheet are also shown in Table 1.

TABLE 1

|  |  | Ex. 1 | Comp. Ex. 1 |
| --- | --- | --- | --- |
| Thickness (mm) |  | 1.17 | 1.10 |
| Expansion ratio (times) |  | 37.5 | 37.0 |
| Corrugation value[1] |  | 0.06 | 1.0 |
| Tensile strength (kg/cm$^2$)[2] | Machine | 7.65 | 7.84 |
|  | transverse | 3.80 | 2.72 |
| Elongation (%)[3] | Machine | 94.5 | 79.5 |
|  | transverse | 80.0 | 71.3 |
| Tear strength (kg)[4] | Machine | 0.30 | 0.28 |
|  | transverse | 0.19 | 0.15 |
| Shrinkage factor (%)[5] | Machine | −12.5 | −17.6 |
|  | transverse | −9.6 | −3.8 |
| Stiffness (mm)[6] | machine | 10 | 10 |

TABLE 1-continued

|  | Ex. 1 | Comp. Ex. 1 |
|---|---|---|
| transverse | 50 | 73 |

1) Corrugation vale = $\dfrac{\text{Average ridge height of corrugations (mm)}}{\text{Average pitch width of corrugations}/2 \text{ (mm)}}$
2) Tensile strength: JIS K-6767 was followed.
3) Elongation: JIS K-6767 was followed.
4) Tear strength: JIS K-6767 was followed.
5) Shrinkage factor: The shrinkage factor of each foamed sheet was determined by forming a pair of spaced cuts in the foamed sheet in parallel with each of the machine direction and the direction perpendicular to the machine direction, namely, the transverse direction to obtain a sample of 20 cm × 20 cm, heating the sample for 15 seconds in an oven controlled at 100° C. and then measuring the dimensional change in each of the machine and transverse directions.
6) Stiffness: A 100 mm × 150 mm sample was cut out from each foamed sheet. The stiffness of the foamed sheet was expressed by the degree of sagging of the foamed sheet when the sample was fixed at one of the sides, namely, the height between the fixed side and the opposite side.

We claim:

1. An apparatus for the production of a foamed polyolefin sheet having an expansion ratio of more than 15 from a foamed tubular body extruded through an annular die provided at an end of an extruder, which comprises:

a cylindrical cooling device, having a peripheral surface contactable with an inner surface of said foamed tubular body, which removes heat from said foamed tubular body when said foamed tubular body passes over said peripheral surface of said cooling device, said cylindrical cooling device including at least one upstream section and at least one downstream section wherein a maximum diameter MD of the cylindrical cooling device is smaller than a distance ML from an upstream end of a most upstream section of the cooling device to a downstream end of a most downstream section of the cooling device, wherein said cooling device is positioned to receiver and cool said foamed tubular body, said die and said device satisfying the equation $$DD/MD = \text{about } 0.1 \text{ to about } 0.5$$

wherein DD is a ring diameter of the annular die and MD is said maximum diameter of said cylindrical cooling device;

an air blower having a first air outlet, to an inner wall of the foamed tubular body, arranged between the annular die and the most upstream section of the cylindrical cooling device, and a secondary outlet, to the inner wall of the foamed tubular body, between at least two adjacent sections of the cylindrical cooling device, respectively, whereby in operation said air blower blows air through said outlets at a pressure of about $5 \times 10^{-4}$ to about $3 \times 10^{-2}$ kg/cm² (G) thereby increasing the internal pressure of the foamed tubular body and applying tension to the foamed tubular body at the inner wall of said tubular body; and a means for slitting the foamed tubular body in the direction of extrusion;

wherein the cooling device satisfies the relations:

$$5 > ML^1/MD > 1.5$$

$$3 > MML/ML^1 > 0.4$$

wherein $ML^1$ is a length of a section of the cooling device, MD is said maximum diameter of the cooling device, and MML is a distance from a downstream end of a section of the cooling device to an upstream end of an immediately adjacent downstream section of the cooling device.

2. The apparatus as claimed in claim 1, wherein at least one of said at least two sections of the cylindrical cooling device is movable.

3. The apparatus as claimed in claim 1, wherein the MD of the cylindrical cooling device is within the range of 150–1,000 mm.

4. An apparatus for forming foamed polyolefin sheet having an expansion ratio of more than 15 from an extruded foamed polyolefin tubular body, comprising an extruder having an annular die for forming a foamed polyolefin tubular body;

a cooling device, having a peripheral surface contactable with an inner surface of said foamed tubular body, which removes heat from said foamed tubular body when said foamed tubular body passes over said peripheral surface of said cooling device, for receiving thereon and cooling said extruded tubular body, said cooling device comprising an upstream section and a downstream section and having a maximum diameter MD which is smaller than a distance ML between an upstream end of the upstream section and a downstream end of the downstream section, said die and said cooling device satisfying the equation $$DD/MD = \text{about } 0.1 \text{ to about } 0.5$$

wherein DD is a ring diameter of said annular die and MD is said maximum diameter of said cylindrical cooling device;

an air blower having a first air outlet, between the annular die and the upstream section, and a second outlet, between the upstream section and downstream section, whereby during operation air is blown at a pressure of about $5 \times 10^{-4}$ to about $3 \times 10^{-2}$ kg/cm² (G) from said first and second outlets to increase the internal pressure of the cooled tubular body and apply tension to the tubular body at an inner wall of said tubular body; and a slitter for slitting the cooled tubular body in the direction of extrusions;

wherein the cooling device satisfies the relations:

$$5 > ML^1/MD > 1.5$$

$$3 > MML/ML^1 > 0.4$$

where $ML^1$ is a length of a section of the cooling device, MD is said maximum diameter of the cooling device, and MML is a distance from a downstream end of a section of the cooling device to an upstream end of an immediately adjacent downstream section of the cooling device.

* * * * *